United States Patent

Venturi

[15] 3,690,298
[45] Sept. 12, 1972

[54] APPARATUS FOR COATING ARTICLES WITH A DRY POWDERED MATERIAL

[72] Inventor: Enrico Venturi, Via Lorenteggio, 39, Milan, Italy

[22] Filed: May 22, 1970

[21] Appl. No.: 39,909

[52] U.S. Cl.................118/629, 117/17, 118/DIG. 5, 118/621
[51] Int. Cl.................................................B05c 5/02
[58] Field of Search......118/621, 623, 624, 629, 630, 118/429, 400.5, DIG. 5; 117/17, 21

[56] References Cited

UNITED STATES PATENTS

| | | | |
|---|---|---|---|
| 2,907,299 | 10/1959 | Weiner | 118/400.5 |
| 3,067,949 | 12/1962 | Sigvardsson et al. | 118/629 |
| 3,248,253 | 4/1966 | Barford et al. | 118/400.5 |
| 3,233,584 | 2/1966 | Angstadt | 118/429 |
| 3,241,520 | 3/1966 | Wurster et al. | 118/62 |

*Primary Examiner*—Morris Kaplan
*Assistant Examiner*—Leo Millstein
*Attorney*—Diller, Brown, Ramik & Holt

[57] ABSTRACT

An apparatus are disclosed for coating an article of manufacture to be varnished by coating it with a powdered resin and then heat-cured. A localized powder-cloud is formed internally of a tunnel, the tunnel overlying a tub in which the powdered resin is contained. Means are provided for forming a fluidized bed with the powder particles and means are also provided to provide a temporary adhesion of the powder to the articles (e.g. a glue or a system of electrostatic charges) prior to the final anchoring obtained by curing.

1 Claim, 6 Drawing Figures

PATENTED SEP 12 1972 3,690,298
SHEET 1 OF 4
Fig.1
Fig.2
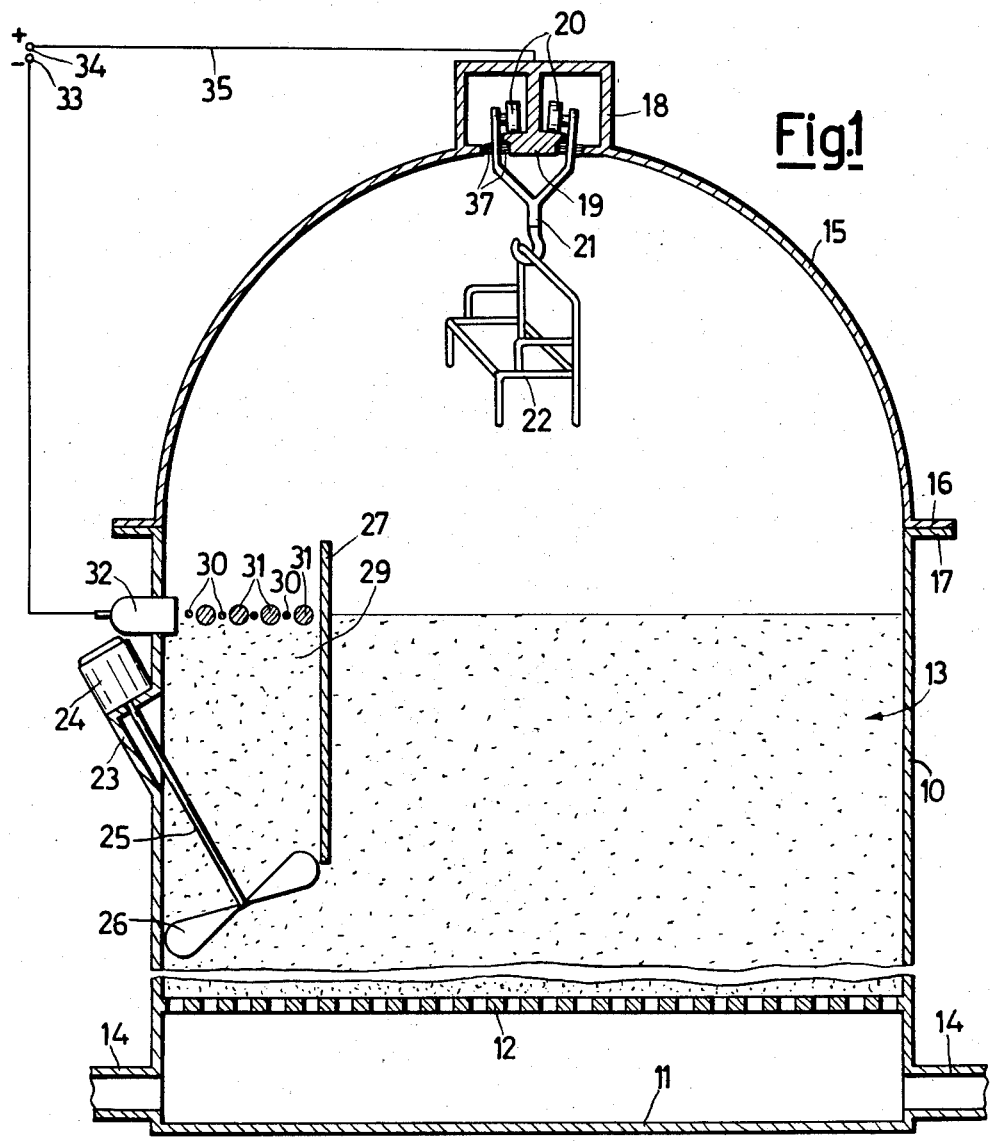
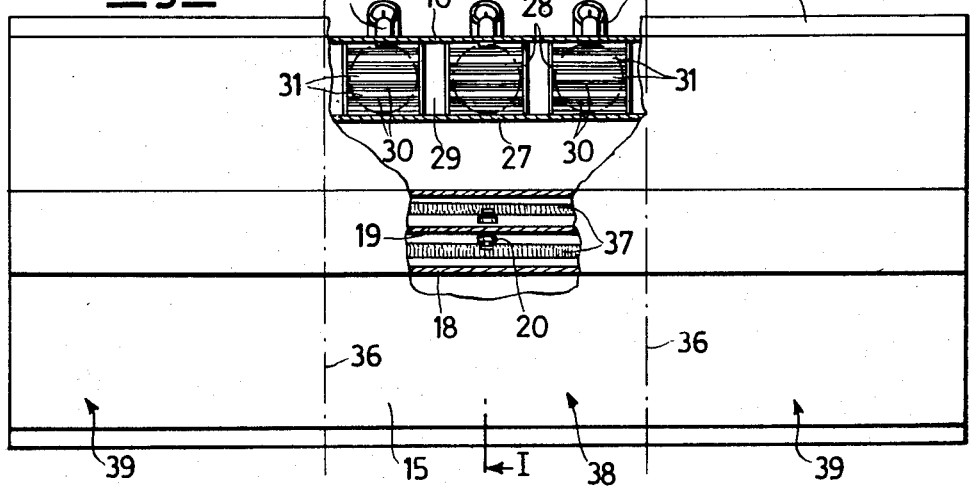

3,690,298

APPARATUS FOR COATING ARTICLES WITH A DRY POWDERED MATERIAL

This invention relates to an apparatus for applying, in a continuous and automatic fashion, particles of a dry material to an article of manufacture. More particularly, the invention is concerned with finishing operations whereby the outer surfaces of articles of manufacture are coated with a continuous film of a plastics material.

The method for varnishing, plastic-coating and anyhow coating articles of manufacture by applying dry powders thereto are known long since and commercially applied on a large scale.

Basically, these methods tend to deposit on the surface of an article of manufacture the coating material (which is generally a synthetic resin to which dyeing pigments may be added if so desired) in the form of a finely divided dry powder and, in a subsequent stage, to transform the powdery film or layer as deposited on the surfaces of the article concerned, into a continuous, homogeneous and firmly adherent coating. As a rule, said transformation is brought about by melting the particles, with a possible concurrent polymerization thereof, said results being obtained by heat treatment in an oven, in very much the same way as is practised with the conventional varnishes dissolved in a solvent.

The techniques adopted heretofore for the industrial achievement of these methods can be substantially grouped into two categories, viz.:

a. Dipping in a fluidized bed
b. Spraying

In the former instance, a tub open at the top is provided, whose bottom wall is a porous slab. The tub is charged with a certain amount of coating material, in the form of a very fine powder and in a dry condition, which settles on the bottom wall. Through the porous slab an air stream is sent, at not too high a speed, which lifts the powdered particles which thus become an airborne mass: thus the apparent volume of the mass is increased and the mass itself takes the appearance and the properties of a thick fluid kept under not too brisk a boil. If now the article of manufacture, which had been previously wetted by glue or, as an alternative, preheated to the melting point temperature of the powder, the powdery particles which surround the article concerned are deposited thereon in the form of a powdery layer stuck to the surfaces of the article. The article is then heat treated in a curing oven as outlined above.

This method is impaired by a number of shortcomings, the most serious of which is that the article to be coated should be previously wetted by a glue or preheated to a high temperature. Another drawback stands in the limitations which are encountered in practice when attempting to realize fluidized beds having a horizontal projected surface exceeding 100–150 square decimeters. Another significant defect is that the entire working cycle is discontinuous and, at any rate, it requires working times which conflict with the necessities of an industrial mass-production.

An improvement over the method aforementioned consisted in exploiting electrostatic attraction forces to cause the layer of powdered material initially to stick to the workpieces.

To this end, a cathode grid has been inserted in the fluidized bed, by causing the workpieces to act as anodes and establishing between said anode and cathode an appropriately high potential differential.

Even so, however, the defects aforementioned of discontinuity in processing and long duration in time of same are not overcome, the same being also true of the defects inherent in the intrinsic limitations of the fluidized bed.

Methods and apparatus of the second category, i.e. (b) as mentioned above, essentially consist in using a spraying gun to which an air or gas-stream is fed so that the dry particles of the coating composition are suspended and hurled against the surfaces of the workpiece to be coated. Prior to emerging from the muzzle of the spraying gun the particles are caused to pass through an electrically conductive environment with a potential differential of a few kilovolts with respect to the article to be coated, which has an opposite polarity. The powder particles, which now possess an electrostatic charge, are drawn by the workpiece and are deposited on the surfaces thereof to form a film or layer which is then converted into a continuous film by the usual curing operations.

As is well known, this method is predominantly manual one and thus is bound the employment of operators to whose skill the task is entrusted to estimate the thickness uniformity of the layer as deposited onto the several faces of the article to be coated.

In addition, another drawback which should not be overlooked is the loss of the material which is scattered through the environment where the spraying operations are carried out.

Mechanization and automation of the use of spraying guns, both single and multiple, and also both fixed and reciprocated, become extremely awkward in the case of articles of manufacture having an intricate shape and/or being not mass-produced, on account of the variations of the distances between the spraying nozzle(s) and the several points of the workpiece.

In the case of articles of manufacture having an extremely simple and uniform configuration, such as pipes, bands and the like, continuous coating apparatus have been embodied in which the article concerned is caused continuously to pass along the axis of a substantially cylindrical chamber having fixed nozzles circumferentially affixed thereto which are adapted, both as to their number and positions, to cause a spray of air-fluidized powder, which has been electrostatically charged with conventional methods, to impinge on the workpieces everywhere.

The particles of the material which are not deposited on the workpiece fall down on the bottom of the chamber and are recovered therefrom and carried out towards the exterior, to be recycled after appropriate and essential filtration, classification and admixture with fresh powder, for an amount which generally is not less than 50 percent. The principal defects of this method are: (1) the limitation to articles having a constant cross-section; (2) the intricacy of the ancilliary apparatus for recovering and recycling the fallout.

This invention overcomes the problems and defects briefly outlined above and, to this end, it provides an apparatus of the kind comprising a tub wherein a fluidized bed on particles of a dry material is generated by introducing through the bottom a fluidizing gas, is characterized in that it comprises a tunnel of which the tub forms the bottom wall, conveying means adapted to cause the articles to pass in succession along the axis of said tunnel, lifting means placed in said tub and adapted to send a proportion of said suspension of particles which forms the fluidized bed, towards the portion of tunnel which overlies the tub so as to form an atmosphere of particles which extends along about one-third of the tunnel length centrally with respect to the ends thereof, and means for generating an adhesion force between said particles and said articles.

More particularly, the apparatus according to the present invention provides, for creating the above cited particle cloud, the use of at least a blower or helical propeller, with the suction end immersed in the fluidized bed and which generates an ascending suspension stream; which, as guided by the tunnel walls, forms the cloud through which the article to be coated is passed so that each point of the article stays in the area occupied by the cloud for at least 2 seconds. The adhesion force between the particles and the articles is generated with known conventional means as already outlined above. More particularly, and preferably said force is of an electrostatic nature and is impressed onto the particles, by arranging, downstream of the blower or propeller, an electrodic corona-discharge device, well known in the art, whereas the article to be coated is connected to the other pole of the generator which feeds the device aforesaid, or anyhow with a source of electricity adapted to impress to the article to be coated a charge having a sign opposite to that of the particles which make up the fluidized bed. As an alternative, in order to electrify the particles, air, which has been previously ionized and admixed with the proportion of particle suspension, can be used.

The tunnel, in practice, is divided into three portions, of which the central one is occupied by the cloud of particles and the side portions are a mere extension of the central portion for recovering the particles which fall out of the cloud. As a matter of fact, the proportion of the suspension which is sent to the central portion by the blower or the propeller is composed by particles which, when they are not deposited on the article and thus carried away thereby, fall freely into the underlying tub.

It is obvious that the time of stay of each cross-section of the article to be coated in the volume occupied by the cloud, as aforesaid, once that a working speed or advance speed of the article to be coated along the tunnel has been established, defines the length of the central portion: the side portions or recovery portions in turn will have, as an average, the same length as the central portion.

The height of the tunnel, more particularly of the empty space above the fluid bed, should not be less than twice the height of the cross-section of the article, that is, its maximum vertical dimension in the position taken during conveyance, whereas all the points of the article will not be closer to the tunnel walls than 25 cms.

The tub to form and contain the fluidized bed is of conventional type and has a bottom wall formed by a porous diaphragm through which the gaseous fluid is fed with the methods which are well known in the fluidized bed art, so as to form the particle suspension. As outlined above, the tub is the base portion of the tunnel and thus it has the same dimensions as the tunnel, in plan view, whereas the height of the edge of the tub, as measured starting from the porous diaphragm, should be at least twice the height of the so-called fixed bed, that is, the thickness of the layer of dry powdered material when no fluidization gas is fed. By so doing, a free expansion is ensured even in the limiting case where the volume of the fluidized bed is doubled.

The aforementioned cloud of particles of dry material is formed by resorting to either of two methods, namely:

a. employing one or more helical propellers with the drawing pipe immersed in the fluid bed so as to draw the material at about one half of the tub height. The drawing area is defined by vertical walls, possibly cylindrical, which separate the drawing space from the remaining part of the fluid bed without however cutting the free communication and the circulation of the particle suspension while preventing undesirable whirling motion from being impressed to the fluid bed.
b. using one or more centrifugal blowers mounted on the outer longitudinal sidewalls of the tub, whose drawing mouth is opened at about one half of the tub height into the fluidized bed. The delivery side of the blower, or of each blower, opens, through appropriate manifolds, into the immediately overlying tunnel wall so as to originate the cloud described above.

It is obvious that both the number and the arrangement of the helical propellers as well as of the centrifugal blowers are a function of the size of the tunnel central area which shall be occupied by the suspension. Their rate of flow should be selected on the basis of the following factors:

1. amount of particles which stick to the article to be coated, as an average.
2. volume of the cloud of suspended particles
3. concentration of solids required by the suspension.
4. concentration of solids in the fluidized bed
5. fallout velocity of the particles.

Usually and preferably, the concentration of solids in the fluidized bed is 300–600 grams per liter, whereas the amount of particles taken up by the article is 40–120 grams per square meter. The fallout velocity of the particles, according to the specific gravity and the granule size of the powder, usually varies between a fraction of one centimeter per second and 35 cms. per second. On taking into account, lastly, that the density or concentration of solids in the cloud should be at least 5 grams per liter, and preferably comprised between 7 and 15 g/liter, it is easy, on the basis of the other parameters of the tunnel, to calculate the number and the rate of flow of the lifting means for the proportion of particles of the fluidized bed. According to a first embodiment of the invention, the lifting means are arranged on a side of the tub only and generate a whirling cloud which tends to fall on the opposite side.

According to an alternative embodiment, the lifting means are arranged on both sides of the tub so that an enhanced turbulence is obtained for the cloud along with a more frequent renewal of fresh suspension.

Inasmuch as almost all of the resins used to coat articles of manufacture tends to be charged with negative electricity, the article should be placed at the positive leg of the generator. In practice, for reasons of safety and to avoid hazards for the workers it is preferred that both the article to be coated and the relevant pole of the generator be grounded as well as the conveyor. To this end, moreover, the tunnel walls will be coated on both faces with a plastic material having a high insulating power. Preferably, these walls are made of a resin with a metal insert, if necessary. By so doing it is also avoided that the powder of the suspension forming the cloud be deposited on the walls.

The invention will be now described in connection with a few preferred embodiments, without any limitation and having reference to the accompanying drawings, wherein:

FIG. 1 is a cross-sectional view of the device according to the invention, taken along the line I—I of FIG. 2;

FIG. 2 is a plan view partly in section of the device of FIG. 1;

Figure 3:
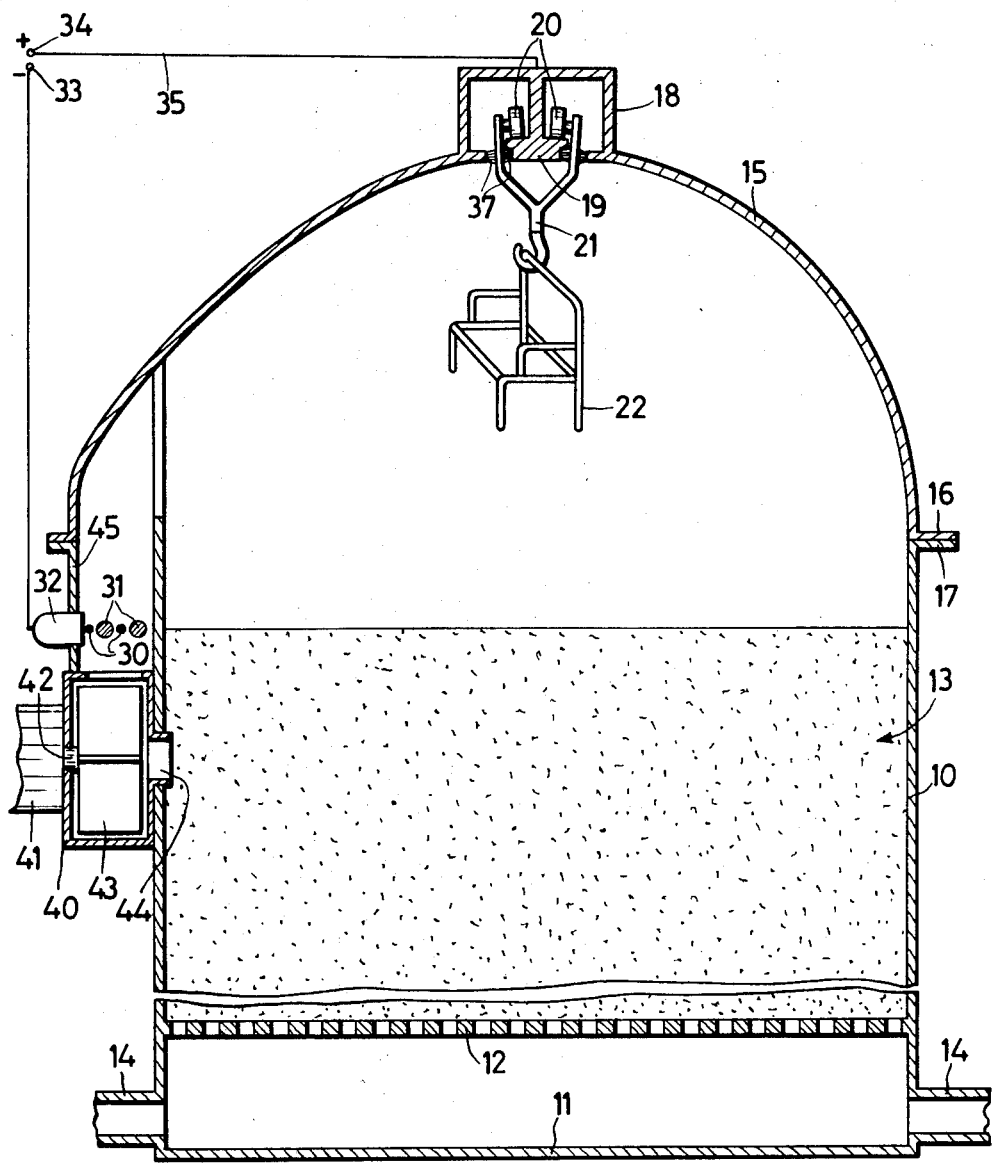
FIG. 3 is a view similar to FIG. 1 of an alternative embodiment of the device.
Figure 4:
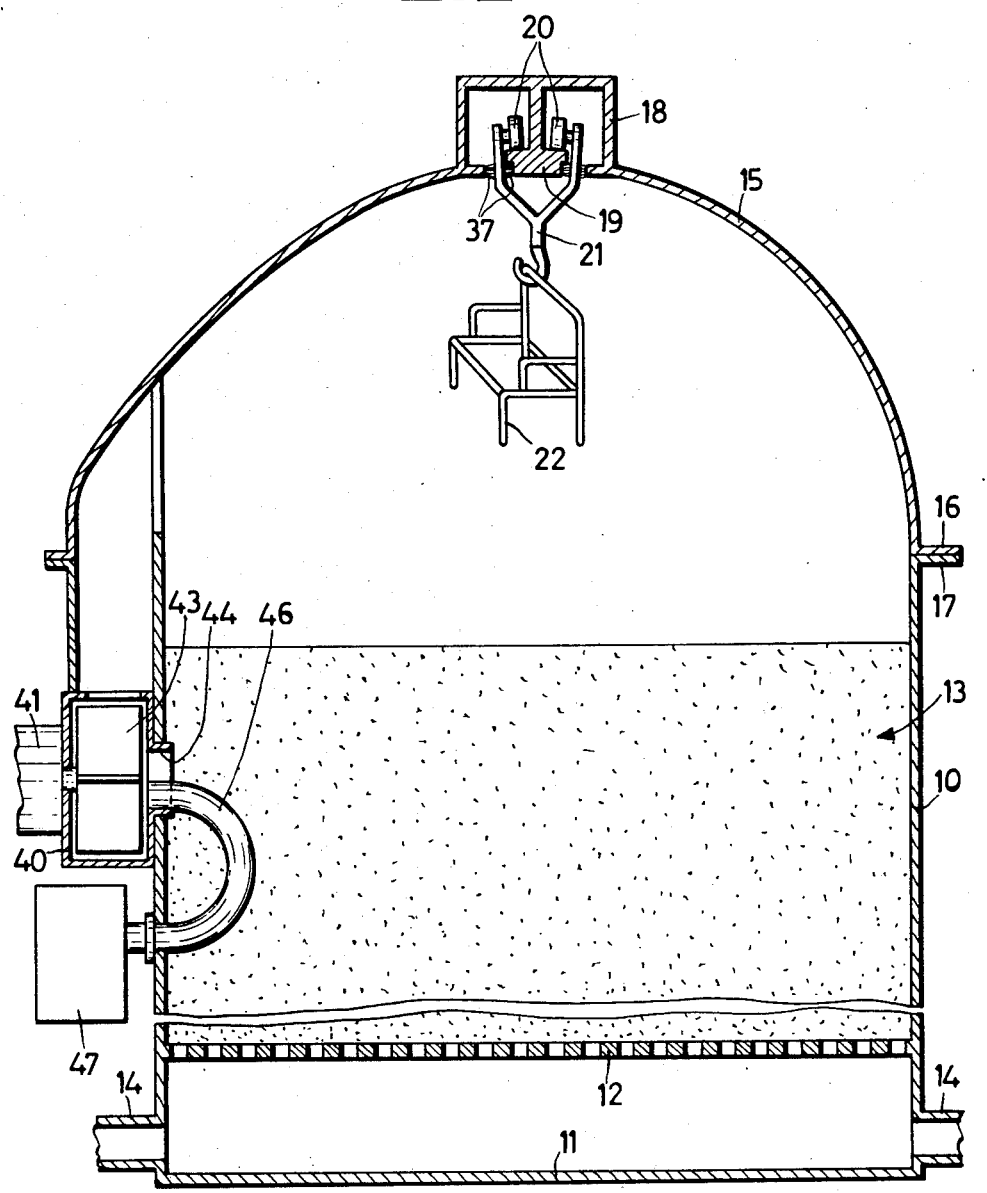
FIG. 4 is a view similar to FIG. 3, of another modification.
Figure 5:
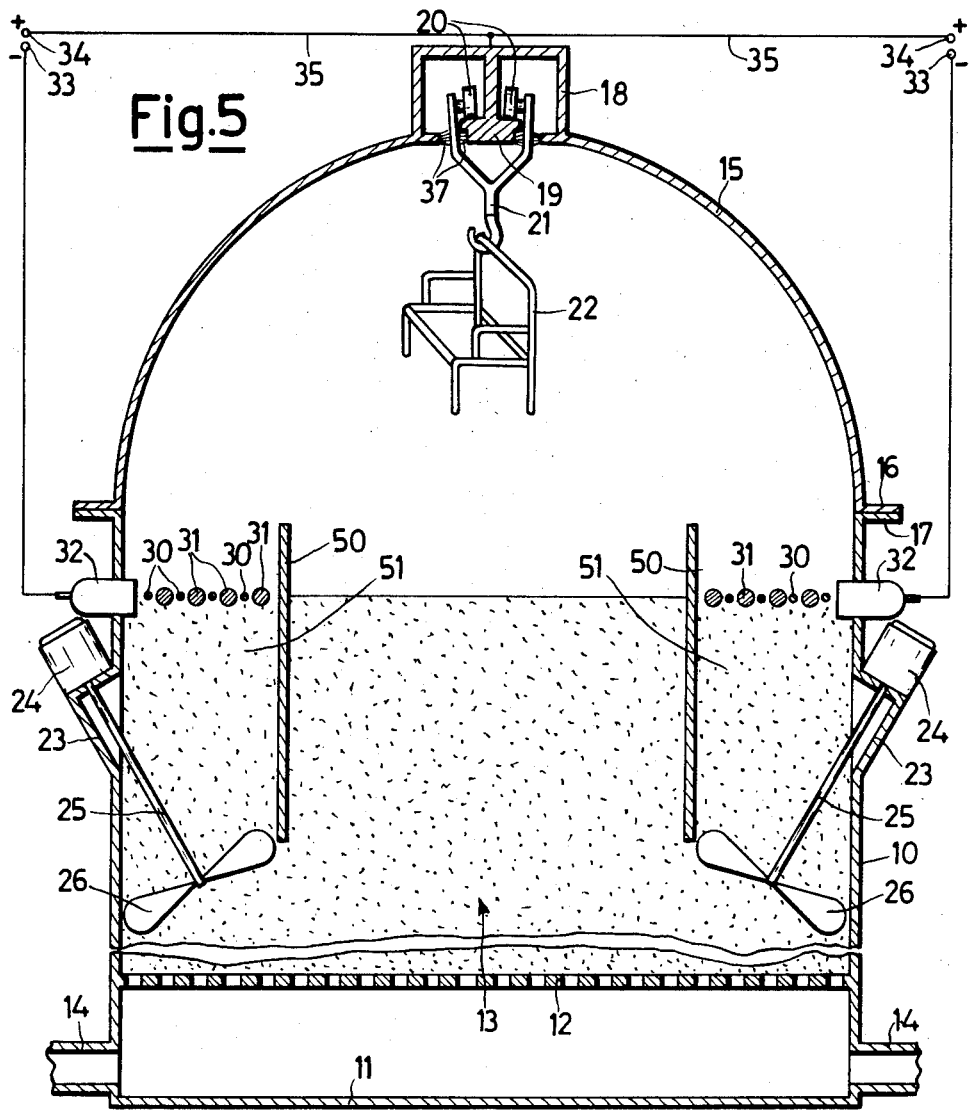
FIGS. 5 and 6 are views, similar to FIGS. 1 and 2, respectively, of a further modification.
Figure 6:
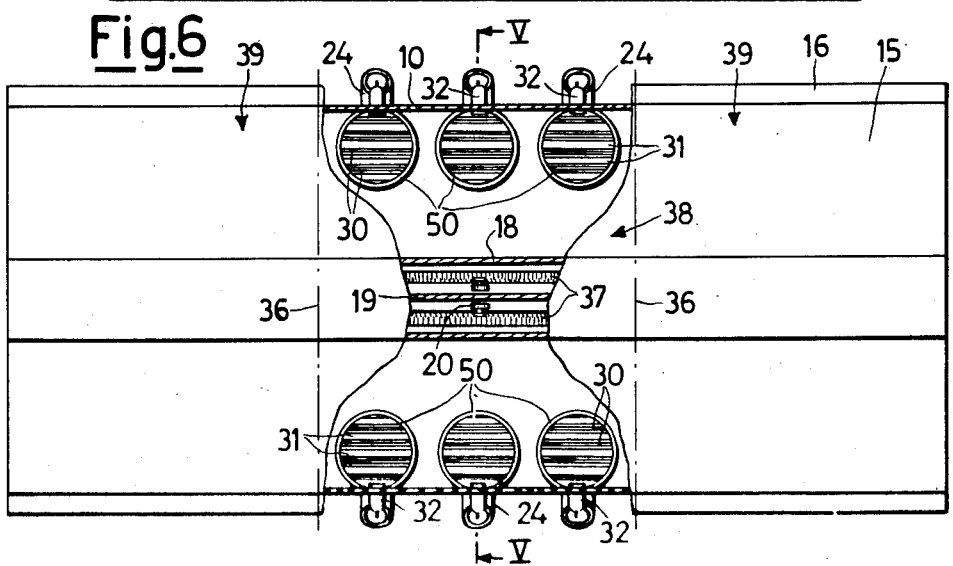

Having now reference, at the outset, to FIGS. 1 and 2, they show a device comprising a tub 10 having a bottom wall 11 and a double bottom formed by a porous diaphragm 12 above which a fluidized bed 13 is formed by the agency of air fed between the bottom 11 and the porous diaphragm 12 via the ducts 14. Above the tub 10 a continuous tunnel or covering 15 is provided, which is affixed with appropriate means (not shown) along the lower edge 16, to the upper edge 17 of the tub 10. Along the summit line of the tunnel 15 there is an aerial conveyor formed by a boxlike casing 18, equipped with a rail 19 on which wheels 20 of hooks 21 can slide, to which the articles 22, to be coated with particles of dry powdered material forming the fluidized bed 13 are hung. The hooks 21, as is usual in the technique of aerial conveyors, will be set at appropriate intervals along a continuous chain (not shown) which is powdered by conventional motive means (also not shown).

It is important to notice that the contact between the article 22 and the hook 21 should always be such as to ensure a thorough conduction of electricity therebetween. Along one side of the tub 10 and externally, by means of appropriate supporting members 23, electric motors 24 are mounted (in the number of three in the case of FIGS. 1 and 2), whose shaft 25 carries, at the end placed in the interior of the tub 10 a blade propeller, or helix 26, situated approximately midway of the height of the tub 10. Of course, appropriate sealing gaskets (not shown) are located where the shaft 25 enters the tub 10.

A partition or diaphragm 27 is mounted in a suspended position in the fluidized bed 13 by the agency of suitable means, as exemplified by the rods 28, so as to delimit, in part, an environmental area 29 in the interior of the fluidized bed 13, the width of this area being equal (or so) to the working diameter of the propeller 26 and the length being such as to encompass all of the propellers 26. In correspondence with each propeller, and above the same, conventional electric devices are provided for delivering corona discharges, as diagrammatically indicated at the electrodes 30 and 31, respectively, of which the electrodes 30 are fed through a common commutator 32 connected to the negative pole 33 of a generator of DC voltage (not shown) whereas the electrodes 31 are grounded, as is usual. The positive pole 34 of the generator is grounded and connected through the lead 35 to the boxlike casing 18 of the overhead conveyor. In this connection it should be noted that, to prevent powder from entering the boxlike casing 18, appropriate brushes 37 are provided, mounted along the whole tunnel 15.

It should be observed in FIG. 2 that the tunnel 15 is ideally divided into three portions (as shown in dotted lines at 36) the central one of which, 38, is completely filled by the cloud as generated by lifting the proportion of particle suspension from the fluidized bed 13, whereas the side portions 39 are intended only as extensions of the central portion for recovering the fallen particles.

In the embodiment shown in FIG. 3 (wherein parts equal to those of FIGS. 1 and 2 are indicated by equal reference numerals), for lifting the proportion of particle suspension a centrifugal blower is provided which has a hood 40 mounted externally of the tub 10. An external motor 41 actuates via the shaft 42 a vaned rotor 43. The suction end 44 of the centrifugal blower opens directly through the tub wall at a height which is preferably in the order of one half approximately of the tub height whereas the delivery side of the blower consists of a guiding duct 45 which opens freely in the tunnel 15 and is appropriately radiussed to the curvature of the tunnel wall so as to form a swirling cloud around the article 22. In the manifold 45 is inserted, as is the case in FIG. 1, a device capable of imparting a corona-effect electrostatic charge to the particles of dry powdered material.

The embodiment shown in FIG. 4 differs from the one shown in FIG. 3 in that the suction end of the centrifugal blower is connected to a duct 46 for introducing ionized air as supplied by a device indicated generally at 47 and in which, in a manner which is well known in the art, air is fed, which is ionized, for example, by electric discharges. The ionized air which enters through the suction end 44 is admixed to the proportion of fluidized bed which has been drawn up and gives rise to the electrification of the resin particles. Of course, the boxlike casing 18 of the overhead conveyor is appropriately grounded.

In the embodiment shown in FIGS. 5 and 6, the same type of propeller as shown in FIGS. 1 and 2 is illustrated, the only difference being that the diaphragm 27 consists of individual cylindrical diaphragms which encompass areas 51 where the desired proportions of particle suspension are lifted from the fluidized bed.

The basic feature of the claimed method remains now to be emphasized, that is, the feature of generating a cloud of particles through which the article to be coated is caused to pass at an appropriate speed and the particles of the cloud fall into the fluidized bed again and are recycled without any intermediate recovery or treatment of the particles involved.

Practical experiments have been conducted with an apparatus having the following specifications.

A fluid bed has been originated in the tub, starting from a fixed bed height of 40 cms. The tunnel had a height of 70 cms. as measured in terms of height of the chamber above the tub. The volume of the suspended cloud was 600 cubic decimeters. The tests were carried out with an epoxy resin having an apparent specific gravity of from 500 to 600 grams per liter, using test strips formed by carbon stell sheets having a thickness of 0.8 mm. and a size of 20 by 30 cms., bent midway of the longer side and having an overall exposed surface of 12 square decimeters.

The fluidized bed had a density of 350–430 g/liter whereas the suspended cloud contained a weight of powder of from 4,500 to 6,000 grams. To lift the cloud, a centrifugal blower has been used, whose rate of flow was adjustable at the intake side and which had a rate of flow of from 1.6 to 3 liters per second, corresponding to a lift of 800 to 1,250 grams of powder per second.

The electrostatic charge to the particles has been impressed by means of a device having corona discharge electrodes. The average falling down time of the particles has been measured and found equal to 6 seconds approximately.

Upon curing, coatings having a thickness of from 40 to 80 microns have been found, according to the kind of resin used, the applied voltage and the deposition time (comprised between 5 and 20 seconds). The coating had a very good adherence and a uniform lock. Variations in thickness between the several faces of the test strip did not exceed 10 percent.

What is claimed is:

1. An apparatus for coating articles of manufacture with a dry powdered material, of the kind comprising a tub in which a fluidized bed is generated with particles of a dry material by introduction of fluidizing air through the tub bottom wall, characterized in that it comprises a tunnel of which the tub is the bottom wall, conveying means adapted to cause articles of manufacture to be passed in succession along the tunnel axis, means situated in said tub and adapted to send a proportion of said suspension of particles on the portion of the tunnel which overlies the tub so as to form an atmosphere of particles which extends along about one third of the tunnel length centrally with respect to the ends thereof, means for generating an adhesion force between the particles and the articles, said lifting means consisting of at least one centrifugal blower mounted externally of the tub, the suction end of the blower being opened through the tub side about halfway of the height of the tub side and the delivery side of the blower being formed by a conveyance duct whose top end opens into the wall of the overlying tunnel, the walls of the conveying duct being radiussed to those of the tunnel.

* * * * *

UNITED STATES PATENT OFFICE
CERTIFICATE OF CORRECTION

Patent No. 3,690,298                    Dated September 12, 1972

Inventor(s) ENRICO VENTURI

It is certified that error appears in the above-identified patent and that said Letters Patent are hereby corrected as shown below:

On the abstract page, read the following: -- Claims priority, application Italy, May 24, 1969, 17,291 A/69 --

Signed and sealed this 24th day of April 1973.

(SEAL)
Attest:

EDWARD M. FLETCHER, JR.
Attesting Officer

ROBERT GOTTSCHALK
Commissioner of Patents